United States Patent [19]

Minor

[11] Patent Number: 4,624,333
[45] Date of Patent: Nov. 25, 1986

[54] METHOD AND APPARATUS FOR STARTUP OF A HYDROSTATIC TRANSMISSION

[75] Inventor: Ray C. Minor, Abingdon, Va.

[73] Assignee: New Holland, Inc., New Holland, Pa.

[21] Appl. No.: 645,590

[22] Filed: Aug. 30, 1984

[51] Int. Cl.⁴ ............................................. B62D 11/02
[52] U.S. Cl. .................................... 180/6.48; 180/306
[58] Field of Search ...................... 180/6.48, 306, 307; 60/484, 486

[56] References Cited

U.S. PATENT DOCUMENTS

| | | | |
|---|---|---|---|
| 3,279,637 | 10/1966 | Olson et al. | 60/484 |
| 3,646,596 | 2/1972 | Bauer | 60/486 |
| 3,808,813 | 5/1974 | Spinks | 60/486 |
| 4,117,899 | 10/1978 | Sugaser et al. | 180/6.48 |
| 4,146,294 | 9/1978 | Johnston | 180/307 |
| 4,161,992 | 7/1979 | Abels et al. | 180/306 |
| 4,168,757 | 9/1979 | Mather et al. | 60/484 |

*Primary Examiner*—John J. Love
*Assistant Examiner*—Mark C. Dukes
*Attorney, Agent, or Firm*—Larry W. Miller; Frank A. Seemar; Darrell F. Marquette

[57] ABSTRACT

An improved method and apparatus for the cold weather startup of a hydrostatic transmission in a skid-steer loader is disclosed wherein the flow of hydraulic fluid is directed through the hydraulic system for operating the work implement to heat up the hydraulic fluid before being directed into the hydrostatic transmission prior to engaging the drive to the transmission. By disconnecting the drive between the engine and the hydrostatic transmission, the fluid in the hydrostatic transmission can be warmed before engaging the drive to reduce the startup problems due to inherent resistances of cold hydrostatic transmissions. Utilization of the hydraulic control valve for controlling the operation of the work implement to direct the flow of hydraulic fluid over a relief valve built therein permits the hydraulic fluid to be heated quickly.

8 Claims, 2 Drawing Figures

METHOD AND APPARATUS FOR STARTUP OF A HYDROSTATIC TRANSMISSION

BACKGROUND OF THE INVENTION

The present invention relates generally to skid-steer loaders and, more particularly, to a method and apparatus for the startup of the hydrostatic transmission used in skid-steer loaders under cold weather conditions.

The connection of a hydrostatic transmission directly to the engine of a skid-steer loader increases the cranking load on the engine starter and, thereby, makes starting more difficult, especially in cold weather. It has been found that the starting problem is potentially most severe on small skid-steer loaders because of the use of smaller engines, less powerful starter motors, etc. A previously known method of improving the startup conditions for small skid-steer loaders in cold weather is to drive the hydrostatic transmission from the engine with a belt drive that can be disengaged during the initial startup of the engine. In cold weather conditions, however, problems can still be encountered when the belt drive between the engine and the hydrostatic transmission is engaged, as the resistance of a cold hydrostatic transmission will have a tendency to kill the engine. Accordingly, it would be desirable to provide a method and apparatus to improve the starting capabilities of skid-steer loaders in cold weather conditions.

SUMMARY OF THE INVENTION

It is an object of this invention to overcome the aforementioned disadvantages of the prior art by providing a method and apparatus for the improved cold weather startup of a hydrostatic transmission on a skid-steer loader.

It is another object of this invention to warm the hydraulic fluid within the hydrostatic transmission before engaging the drive thereto.

It is a feature of this invention that a relief valve can be utilized to quickly heat hydraulic fluid entering the hydrostatic transmission.

It is an advantage of this invention that the tendency to stall an engine upon startup of a hydrostatic transmission is reduced.

It is another feature of this invention that the warmed return oil from the boom hydraulic system is directed into the hydrostatic transmission prior to engaging the drive thereto.

It is still another feature of this invention that a charge pump for directing hydraulic fluid through the hydraulic actuators for operation of the boom and work implement and then into the hydrostatic transmission is connected directly to the engine.

It is still another object of this invention to provide a method of cold weather startup of a vehicle having an engine and a hydrostatic transmission that reduces the chances of stalling the engine.

It is another advantage that this invention is particularly adaptable for use with a hydrostatic transmission that can be disconnected from the engine for startup.

It is yet another feature of this invention that the charge flow of hydraulic fluid into the hydrostatic transmission is directed from the return lines of the boom hydraulic system.

It is a further object of this invention to provide a method and apparatus for the cold weather startup of a hydrostatic transmission on a skid-steer loader which is durable in construction, inexpensive of manufacture, carefree of maintenance, facile in assemblage, and simple and effective in use.

These and other objects, features and advantages are accomplished according to the instant invention by providing an improved method and apparatus for the cold weather startup of a hydrostatic transmission in a skid-steer loader wherein the flow of hydraulic fluid is directed through the hydraulic system for operating the work implement to heat up the hydraulic fluid before being directed into the hydrostatic transmission prior to engaging the drive to the transmission. By disconnecting the drive between the engine and the hydrostatic transmission, the fluid in the hydrostatic transmission can be warmed before engaging the drive to reduce the startup problems due to inherent resistances of cold hydrostatic transmissions. Utilization of the hydraulic control valve for controlling the operation of the work implement to direct the flow of hydraulic fluid over a relief valve built therein permits the hydraulic fluid to be heated quickly.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
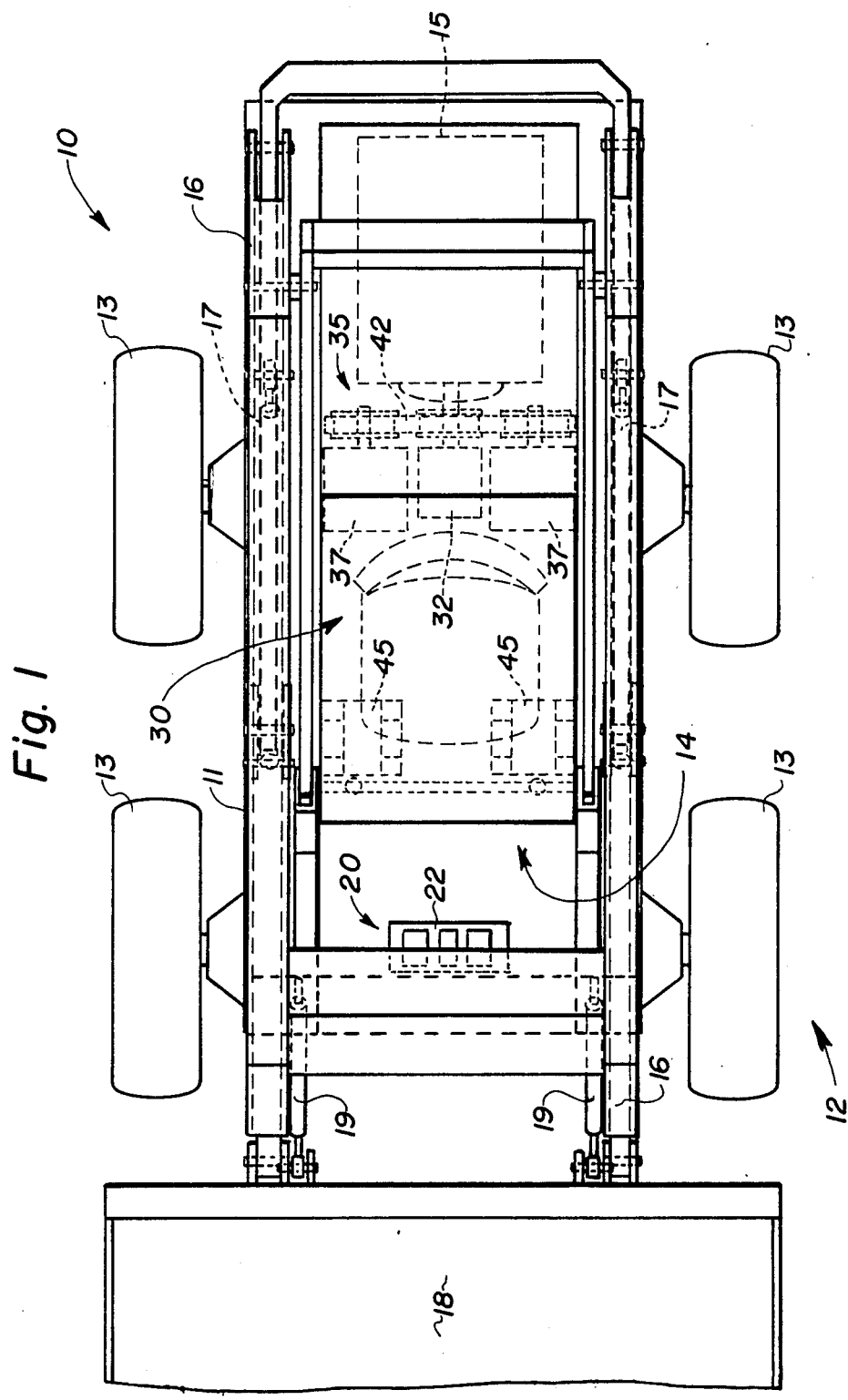
FIG. 1 is a top plan view of a skid-steer loader incorporating the principles of the instant invention.

Referring now to the drawings and, particularly to FIG. 1, a top plan view of a skid-steer loader incorporating the principles of the instant invention can be seen. Any left and right references are used as a matter of convenience and are determined by standing at the rear of the machine, facing the forward end, where the work implement is attached to the loader boom structure.

Figure 2:
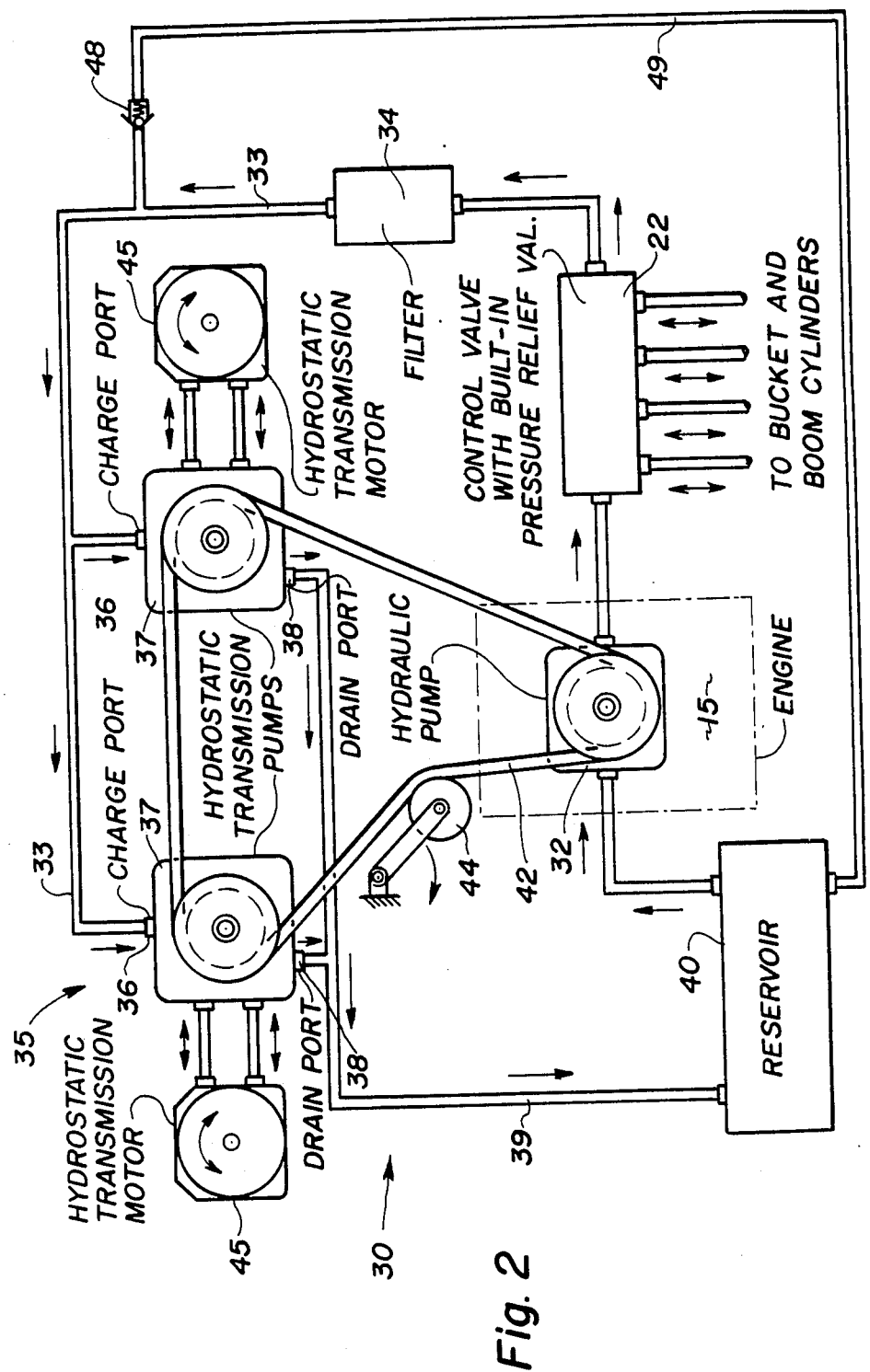
FIG. 2 is a schematic drawing of the hydraulic system incorporating the principles of the instant invention with various components being labelled to facilitate a clearer understanding of the invention.

Referring to FIGS. 1 and 2, it can be seen that the loader 10 is supported by a pair of transversely spaced wheel assemblies 12, each having longitudinally spaced wheels 13. The operator's compartment 14 is mounted between the wheel assemblies 12 and forwardly of an engine 15, serving as the primary source of power to command a view of the operation of the boom structure 16 pivotally supported on the frame 11 and having a work implement 18 detachably connected thereto forwardly of the operator's compartment 14. The pivotal movement of the boom structure 16 is affected through operation of a pair of transversely spaced hydraulic cylinders 17, while relative movement between the work implement 18 and the boom structure 16 is affected by operation of the hydraulic bucket cylinders 19. Actuation of the hydraulic cylinders 17,19 is accomplished through operation of a control mechanism 20 including a hydraulic control valve 22.

According to the principles of the instant invention, the hydraulic system 30 includes a charge pump 32 connected directly to the engine 15 for operation simultaneously therewith to direct hydraulic fluid under pressure to the control valve 22 for operation of the boom 16 and work implement 18. Return oil from the control valve 22 is directed through hydraulic line 33 into the hydrostatic transmission 35. As hydraulic fluid, warmed through operation of the control valve 22 and the hydraulic cylinders 17,19, enters the charge ports 36 of the transmission pumps 37, cold hydraulic fluid exits the pumps 37 through the drain ports 38 to the reservoir 40 through return line 39.

The hydrostatic transmission pumps 37 are driven through a belt drive mechanism 42 operably driven from the engine 15. A declutching device 44 engageable with the belt drive mechanism 42 permits the drive between the engine 15 and the hydrostatic pumps 37 to be interrupted until the hydraulic fluid within the hydrostatic transmission 35 is warmed. After the belt drive 42 has been engaged to permit an operative driving of the hydrostatic transmission 35 by the engine 15, each respective wheel assembly 12 can be driven from the corresponding hydrostatic transmission motor 45 powered with pressurized hydraulic fluid delivered from the corresponding transmission pump 37.

Through utilization of a control valve 22 incorporating a pressure relief valve, the hydraulic fluid entering the control valve 22 can be warmed by forcing the fluid over the relief valve and into the return line 33. Utilization of the pressure relief valve permits an even faster transmission warmup than can be realized through mere operation of the hydraulic boom and bucket actuators 17,19.

As best seen in FIG. 2, the preferred embodiment of the instant invention uses a gear pump as the charge pump 32 to direct the flow of hydraulic fluid into the control valve 22 incorporating a relief valve set at approximately 1600 psi. Hydraulic fluid forced over the reflief valve in the control valve 22 is directed into the return line 33 and through a 10 micron filter 34. A check valve 48 set at 80 psi restricts the flow of hydraulic fluid through the supplemental return line 49 to the reservoir 40, so that hydraulic fluid will be forced through relief valves within the transmission pumps set at 50 psi. Utilization of pump 37 that permit a flushing of fluid therethrough, such as those made by Sundstrand, permits the oil warmed by being forced over the 1600 psi relief valve in the control valve 22 to enter the pumps 37 and displace the colder oil therein. The supplemental return line 49 permits excess hydraulic fluid circulated by the gear pump 32 but not able to be accepted through the pumps 37 to pass over the check valve 48 and to the reservoir 40.

By utilizing the skid-steer loader apparatus described above, the impedence to starting and maintaining operation of the engine 15 under cold weather conditions can be reduced by first actuating the declutching device 44 to disengage the drive means 42 between the engine 15 and the hydrostatic transmission 35 to prevent operation of the hydrostatic transmission 35 when the engine 15 is started. The starting of the engine 15 will affect a circulation of hydraulic fluid through the control valve 22 from the charge pump 32. The hydraulic fluid can be warmed by operation of the hydraulic actuators 17,19 and/or through operation of the hydraulic fluid being directed over the built-in pressure relief valve. Warmed hydraulic fluid is then circulated from the control valve 22 into the hydrostatic transmission 35, forcing colder hydraulic fluid into the reservoir 40. Once the hydraulic fluid within the hydrostatic transmission 35 has been sufficiently warmed, the declutching device 44 can be reactuated to engage the belt drive 42 to permit the driving of the hydrostatic pumps 37 from the engine 15. Since the hydraulic fluid within the hydrostatic transmission 35 has been warmed, the resistance of a cold transmission causing problems with engine stall has been significantly reduced.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly as well as in the specific form shown.

Having thus described the invention, what is claimed is:

1. In a skid-steer loader having a main body frame; wheel assemblies mounted on opposing sides of said main frame to mobilely support said main frame; a hydrostatic transmission operatively associated with said wheel assemblies to provide rotational power thereto, said hydrostatic transmission having an inlet line for the introduction of hydraulic fluid thereto and a return line for the discharge of hydraulic fluid therefrom; an engine mounted on said main frame to provide a source of primary power; a boom structure movably mounted on said main frame and provided with means for attaching work implements, said boom structure and said means for attaching being movable by hydraulic actuators having inlet and return lines for the flow of hydraulic fluid therethrough; and a hydraulic system operatively interconnecting said engine, said hydrostatic transmission and hydraulic actuators for the supplying of hydraulic fluid under pressure to said hydrostatic transmission and said hydraulic actuators to effect operation thereof, the operation of said hydraulic actuators to move said boom structure and said means for attaching work implements causing the hydraulic fluid effecting operation thereof to be warmed, the improvements comprising:

said hydraulic system directing the flow of hydraulic fluid from the return line of said hydraulic actuators to the inlet lines of said hydrostatic transmission so that hydraulic fluid warmed through operation of said hydraulic actuators can be used to warm the hydraulic fluid within said hydrostatic transmission prior to operating said hydrostatic transmission, said hydrostatic transmission including drive means for operatively connecting said hydrostatic transmission to said engine to transfer power therebetween, said drive means being disengageable to permit said engine to be operated without effecting operation of said hydrostatic transmission.

2. The loader of claim 1 wherein said hydraulic actuators include a control valve for controlling the direction of flow of hydraulic fluid to said hydraulic actuators, said control valve being provided with a pressure relief valve, hydraulic fluid passing through said control valve can be warmed by passing over said pressure relief valve before being introduced into the outlet line of said hydraulic actuators and into said hydrostatic transmission.

3. The loader of claim 2 wherein said hydrostatic transmission includes a hydraulic pump, said drive means including a belt interconnecting said hydraulic pump and said engine to transfer rotational power from said engine to said hydraulic pump.

4. The loader of claim 3 wherein said hydraulic system includes a charge pump connected directly to said engine to provide the flow of hydraulic fluid through said hydraulic system when said engine is operated.

5. The loader of claim 4 wherein said charge pump is a gear pump, said hydraulic system including a supplemental return line having a check valve set at a first predetermined pressure to permit a flow of hydraulic fluid to a reservoir, said hydraulic pump having a relief valve incorporated therein and set at a second predetermined pressure lower than said first predetermined pressure.

6. The loader of claim 5 wherein the relief valve in said hydraulic actuator control valve is set at approximately 1600 psi, said check valve being set at approximately 80 psi and the relief valve in said hydraulic pump being set at approximately 50 psi.

7. A method of cold weather startup of a vehicle having an engine; a hydrostatic transmission; hydraulic actuators; a hydraulic system operably interconnecting said hydrostatic transmission and said hydraulic actuators for the supply of hydraulic fluid therebetween, said hydraulic system including a pump driven by said engine to pressurize said hydraulic fluid within said hydraulic system; and drive means interconnecting said engine and said hydrostatic transmission for powering the operation of said transmission, comprising the steps of:

disengaging said drive means to prevent operation of said hydrostatic transmission when said engine is started;

starting said engine;

circulating hydraulic fluid through said hydraulic system;

warming said hydraulic fluid through operation of said hydraulic actuators;

directing warmed hydraulic fluid from said hydraulic actuators to said hydrostatic transmission; and engaging said drive means to transfer rotational power from said engine to said hydrostatic transmission after the hydraulic fluid in said hydrostatic transmission has been warmed.

8. The method of claim 7 wherein said warming step further comprises the step of:

forcing hydraulic fluid over a relief valve associated with said hydraulic actuators.

* * * * *